April 11, 1933.  C. J. ERNST  1,903,445
HOSE AND PIPE COUPLING
Filed Oct. 11, 1930
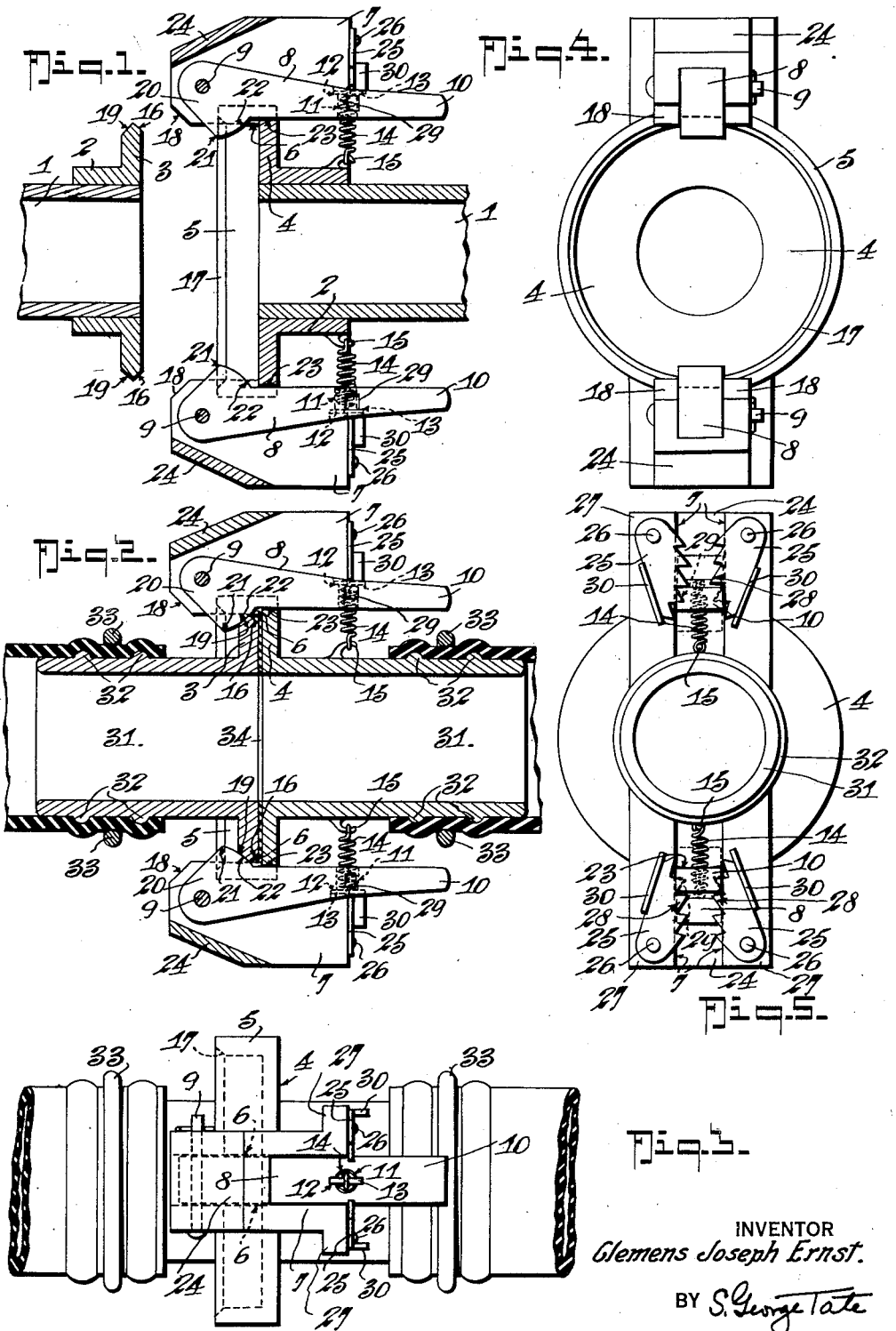
INVENTOR
Clemens Joseph Ernst.
BY S. George Tate
ATTORNEY Patented Apr. 11, 1933

1,903,445

UNITED STATES PATENT OFFICE

CLEMENS JOSEPH ERNST, OF MINSTER, OHIO

HOSE AND PIPE COUPLING

Application filed October 11, 1930. Serial No. 488,108.

The invention generally relates to hose and pipe couplings and has for an object to provide novel male and female coupling heads to be carried at the ends of hose or pipe lengths to be connected in communicating relation and which heads include readily releasable securing devices automatically operable upon the bringing of said heads into associated relation to securely lock said heads together.

Another object of the invention is to provide male and female coupling head members equipped with novel guide centering means serving to facilitate assembly of associated heads and including means to provide a grit or other foreign matter receiving pocket tending to avoid forming inefficient joints due to the interposition of said grit or other foreign matter.

Another object of the invention is to provide in a coupling of the character stated means to secure the coupling heads together in a manner preventing loosening due to vibration, said means being so constructed that pull strains in directions tending to separate the heads will cause said means to more firmly secure said heads together.

With these and other objects in view which will more fully appear, the nature of the invention will be more clearly understood by following the description, the appended claims, and the several views illustrated in the accompanying drawing.

In the accompanying drawing:—

Figure 1 is a part side elevation and part longitudinal section illustrating the invention applied to a pipe joint, the parts being shown in separated relation, Figure 2 is a view similar to Figure 1 and illustrates the invention applied to a hose joint, the parts being shown in assembled relation, Figure 3 is a plan view, Figure 4 is a face view of the female coupling head, and Figure 5 is a rear view of the female coupling head.

Like reference numerals designate corresponding parts throughout the several figures of the drawing.

In the drawing in Figure 1, I have illustrated the invention as applied to sheet metal pipe sections of like diameters. It should be understood, however, that the invention may be applied to the ends of other types of pipe, cast integrally or otherwise, and may also be used as a hose coupling in the manner illustrated in Figure 2.

In the drawing 1, 1 designate ends of pipe lengths which are to be coupled by my improved coupling. Each pipe length has a reinforcing flange 2 secured thereto in any suitable manner as by riveting, welding or the like, or the flange may be formed as an integral part of the pipe.

One of the flanges 2 carries an annular male abutment flange 3 and the other flange 2 carries a female abutment flange 4 which is provided with an overhanging centering flange 5 adapted to snugly receive the male abutment flange 3 as illustrated in Figure 2 of the drawing.

The flange 5 is provided with a plurality of radially disposed openings 6. In this particular disclosure I have shown the openings disposed diametrically opposite but it should be understood that the openings may be otherwise positioned or provided in greater number than the two herein specifically disclosed. Each opening is flanked by extended parallel web walls 7 which serve as mounting means for the lock levers 8 which are pivoted on cross pins 9 supported in said walls. The levers 8 are extended beyond the walls in the direction of the length of the pipe by which they are carried to provide handle portions 10, and each handle portion is provided with an aperture 11 and seats 12 to receive a spring mounting pin 13, a spring 14 being associated with each lever and having one end thereof connected to the pin 13 and the other end connected as at 15 to the flange 2.

The springs 14 serve to yieldably hold the levers in the position illustrated in Figure 1 and by reason of the provision of the apertures 11, it is possible to employ relatively long springs and thus provide for even tension upon the levers at all times. The peripheral edge of the male flange 3 is bevelled as at 16 to cooperate with the similarly bevelled face 17 of the centering flange 5 to facilitate operative assembly of the abutment flanges and to coact with the face of the female abutment flange 4 and the adjacent portion of the centering flange 5 in providing a grit or other foreign matter receiving pocket when the abutment flanges are secured together as illustrated in Figure 2 of the drawing. By reason of the provision of this groove, foreign matter that might otherwise prevent the formation of an efficient joint may find its way into the pocket and thus avoid partial separation of the flanges. It will also be noted that the inner edges of the walls 7 are bevelled as at 18 to further facilitate entrance of the male coupling head 2, 3 into the female coupling head 2, 4, 5.

The male abutment flange 3 is provided with another bevelled surface 19 at the face remote from its engaging face and each lock lever 8 is provided with a lock dog portion 20 having a cam nose 21 adapted to engage said surface 19 to lock the abutment flanges 3 and 4 in tight contact. The surface 19 is of relatively large area to provide a good bearing surface for the lock dog portion and the nose 21 is provided with a cam surface 22 struck on an arc eccentric to the pivotal center of the lever so that as the levers are forced inwardly toward the axis of the flange by which they are carried, the cam surface will progressively force the abutment flanges into tight contact. The flange openings 6 provide inner limiting lugs 23 for the levers and bridge pieces 24 serve to reinforce the web walls 7 and also to provide an outer limit for the levers. As the coupling heads are moved toward each other from the position illustrated in Figure 1 of the drawing to the position illustrated in Figure 2, the male flange 3 will engage the lever cam nose portions 21 and force them outwardly against the tension of the springs 14 and after the male flange has moved into the centering flange 5 far enough, the levers will be pulled inwardly by the springs causing the eccentric surfaces 22 to engage the bevelled surface 19 and force the flanges 3 and 4 into tight contact. Owing to the peculiar arrangement of spring and eccentric locking surface, loosening of the coupling due to vibrations is avoided, and further, by reason of the fact that the point of engagement of the male flange 3 with the lever portions is inwardly of the position of the lever pivots, pulls on the pipe lengths in directions tending to separate the flanges 3 and 4 will automatically cause the levers to tend to more securely hold the flanges together.

If desired, latches may be provided for securely locking the levers in clamped positions. Such latch plates are indicated at 25 and they may be in the nature of flat metal plates pivoted as at 26 to bracket walls 27 extended from the web walls 7 and provided with edge notches 28 to receive the outer edges of the levers to secure them in locked positions. Recesses 29 may be provided in the sides of the levers to facilitate seating of the latch plates and each latch plate is provided with a finger piece 30 to facilitate actuation thereof. These latches are preferably mounted to engage the web wall bracket extensions 27 with sufficient retaining friction to maintain them in any position to which they are moved. It will also be noted that the toothed edges thereof are struck on arcs to facilitate the locking engagement with the levers.

In Figure 2 of the drawing, I have shown the invention applied to a hose coupling. In this adaptation the flanges 2 may be extended as at 31 to provide nipples for insertion into hose ends 32, suitable hose clamping means being generally indicated at 33. In this use of the invention especially, or in both adaptations of the invention if desired, a packing ring 34 may be interposed between the abutment flanges 3 and 4 to assure perfect sealing of the joint.

It is of course to be understood that the details of structure and arrangements of parts may be variously changed and modified without departing from the spirit and scope of my invention.

I claim:—

1. In a joint of the character described, a pair of opposed coupling heads each having an annular abutment flange, and a pivoted joint securing lever carried by one head and adapted to engage the abutment flange of the other head to hold the abutment flanges in engagement, the flange engaging portion of said lever being struck on an arc eccentric to the lever pivot and lying in a radial plane.

2. In a joint of the character described, a pair of opposed coupling heads each having an annular abutment flange, and pivoted joint securing levers carried by one head and adapted to engage the abutment flange of the other head to hold the abutment flanges in engagement, said levers each being individually operative in a distinct radial plane and having their flange engaging portions struck on arcs eccentric to the lever pivots whereby to force the flanges into tighter engagement as the levers are forced toward the axis of the head which carries the levers.

3. In a joint of the character described, a pair of opposed coupling heads each having an annular abutment flange, and pivoted joint securing levers carried by one head and adapted to engage the abutment flange of the other head to hold the abutment flanges in engagement, the flange engaging portions of said levers being struck on arcs eccentric to the lever pivots whereby to force the flanges into tighter engagement as the levers are forced toward the axis of the head which carries the levers, and the points of engagement of the lever portions and the flange engaged thereby being inwardly of the lever pivots whereby attempts to pull the abutment flanges apart will result in tighter seating of the levers.

4. In a joint of the character described, a pair of opposed coupling heads each having an annular abutment flange, and pivoted joint securing levers carried by one head and adapted to engage the abutment flange of the other head to hold the abutment flanges in engagement, the flange engaging portions of said levers being struck on arcs eccentric to the lever pivots, and springs engaging the levers and yieldably holding the flange engaging lever portions in engagement with the flange.

5. In a joint of the character described, a pair of opposed coupling heads each having an annular abutment flange, and pivoted joint securing levers carried by one head and adapted to engage the abutment flange of the other head to hold the abutment flanges in engagement, the flange engaging portions of said levers being struck on arcs eccentric to the lever pivots whereby to force the flanges into tighter engagement as the levers are forced toward the axis of the head which carries the levers, and the points of engagement of the lever portions and the flange engaged thereby being inwardly of the lever pivots whereby attempts to pull the abutment flanges apart will result in tighter seating of the levers, and springs engaging the levers and yieldably holding the flange engaging lever portions in engagement with the flange.

6. In a joint of the character described, a pair of opposed coupling heads each having an annular abutment flange, and pivoted joint securing levers carried by one head and adapted to engage the abutment flange of the other head to hold the abutment flanges in engagement, the flange engaging portions of said levers bearing angular relation to the side of the engaged flange remote from the other flange whereby to force the flanges into tighter engagement as the levers are forced toward the axis of the head which carries the levers.

7. In a joint of the character described, a pair of opposed coupling heads each having an annular abutment flange, and pivoted joint securing levers carried by one head and adapted to engage the abutment flange of the other head to hold the abutment flanges in engagement, the flange engaging portions of said levers bearing angular relation to the side of the engaged flange remote from the other flange whereby to force the flanges into tighter engagement as the levers are forced toward the axis of the head which carries the levers, an annular centering flange carried by the lever carrying head and snugly surrounding the other flange, said centering flange having openings therethrough to receive the levers and extended web walls in which said levers are pivotally mounted.

8. In a joint of the character described, a pair of opposed coupling heads each having an annular abutment flange, and a plurality of pivoted joint securing levers carried by one head in equidistantly spaced relation and each individually operable in a distinct radial plane and adapted to engage the abutment flange of the other head to hold the abutment flanges in engagement, the flange engaging portions of said levers being struck on arcs eccentric to the lever pivots, and the lever engaged portion of the lever engaged flange constituting a bevel face of relatively large area.

9. In a joint of the character described, a pair of opposed coupling heads each having an annular abutment flange, and pivoted joint securing levers carried by one head and adapted to engage the abutment flange of the other head to hold the abutment flanges in engagement, the flange engaging portions of said levers being struck on arcs eccentric to the lever pivots, and releasable latches to lock the levers in set positions.

10. In a joint of the character described, a pair of opposed coupling heads each having an annular abutment flange, and pivoted joint securing levers carried by one head and adapted to engage the abutment flange of the other head to hold the abutment flanges in engagement, the flange engaging portions of said levers bearing angular relation to the side of the engaged flange remote from the other flange whereby to force the flanges into tighter engagement as the levers are forced toward the axis of the head which carries the levers, an annular centering flange carried by the lever carrying head and snugly surrounding the other flange, said centering flange having openings therethrough to receive the levers and extended web walls in which said levers are pivotally mounted, and said lever engaged flange having an inner edge bevel to provide a foreign matter receiving pocket when the flanges are in engagement within the centering flange.

11. In a joint of the character described, a pair of opposed coupling heads each having an annular abutment flange, and pivoted joint securing levers carried by one head and adapted to engage the abutment flange of the other head to hold the abutment flanges in engagement, the flange engaging portions of said levers bearing angular relation to the side of the engaged flange remote from the other flange whereby to force the flanges into tighter engagement as the levers are forced toward the axis of the head which carries the levers, an annular centering flange carried by the lever carrying head and snugly surrounding the other flange, said centering flange having openings therethrough to receive the levers and extended web walls in which said levers are pivotally mounted, said flange openings serving to provide abutment walls to limit movement of the levers in the clamping direction.

12. In a joint of the character described, a pair of opposed coupling heads each having an annular abutment flange, and pivoted joint securing levers carried by one head and adapted to engage the abutment flange of the other head to hold the abutment flanges in engagement, and springs to yieldably secure the levers in flange holding engagement, each lever being bored to receive a portion of the associated spring to enable use of springs of maximum length.

13. In a joint of the character described, a pair of opposed coupling heads each having an annular abutment flange, and pivoted joint securing levers carried by one head and adapted to engage the abutment flange of the other head to hold the abutment flanges in engagement, the flange engaging portions of said levers being struck on arcs eccentric to the lever pivots, and releasable latches to lock the levers in set positions, said latches being frictionally held at adjusted positions and having arcuate and toothed edges to engage said levers.

14. In a joint of the character described, a pair of opposed coupling heads each having an annular abutment flange, and pivoted joint securing levers carried by one head and adapted to engage the abutment flange of the other head to hold the abutment flanges in engagement, the flange engaging portions of said levers bearing angular relation to said other flange whereby to force the flanges into tighter engagement as the levers are forced toward the axis of the head which carries the levers, and pivoted releasable latches having arcuate notched edges to engage the levers and lock them in position.

15. In a joint of the character described, a pair of opposed coupling heads each having an annular abutment flange, and pivoted joint securing levers carried by one head and adapted to engage the abutment flange of the other head to hold the abutment flanges in engagement, the flange engaging portions of said levers bearing angular relation to said other flange whereby to force the flanges into tighter engagement as the levers are forced toward the axis of the head which carries the levers, and pivoted releasable latches having arcuate notched edges to engage the levers and lock them in position, said levers having recesses therein to receive certain of said latch notches.

16. In a joint of the character described a pair of opposed coupling heads each having an annular abutment flange, and a pivoted joint securing lever carried by one head and adapted to engage the abutment flange of the other head to hold the abutment flanges in engagement, the flange engaging portion of said lever being struck on an arc eccentric to the lever pivot and lying in a radial plane and so related to said pivot that attempts to separate the flange automatically tend to force the lever in the flange holding direction.

17. In a joint of the character described a pair of opposed coupling heads each having an annular abutment flange, a pivoted joint securing lever carried by one head and adapted to engage the abutment flange of the other head to hold the abutment flanges in engagement, the flange engaging portion of said lever being struck on an arc eccentric to the lever pivot and lying in a radial plane and so related to said pivot that attempts to separate the flange automatically tend to force the lever in the flange holding direction, and spring elements engaging said levers and urging them in the flange holding direction.

18. In a joint of the character described a pair of opposed coupling heads each having an annular abutment flange, and a pivoted joint securing lever carried by one head and adapted to engage the abutment flange of the other head to hold the abutment flanges in engagement, the lever pivot being extended beyond and overlying the abutment flanges and the flange engaging portion of said lever being struck on an arc eccentric to the lever pivot and lying in a radial plane and so related to said pivot that attempts to separate the flange automatically tend to force the lever in the flange holding direction.

19. In a joint of the character described, a pair of opposed coupling heads each having an annular abutment flange, and pivoted joint securing levers carried by one head and adapted to engage the abutment flange of the other head to hold the abutment flanges in engagement, the pivots of said levers being extended beyond and overlying the abutment flanges and said levers each being individually operative in distinct radial planes and having their flange engaging portions struck on arcs eccentric to the lever pivots whereby to force the flanges into tighter engagement as the levers are forced toward the axis of the head which carries the levers.

In testimony whereof I affix my signature.

CLEMENS JOSEPH ERNST.